US012573317B2

(12) United States Patent
Du et al.

(10) Patent No.: US 12,573,317 B2
(45) Date of Patent: Mar. 10, 2026

(54) ANGLE-ADJUSTABLE THREE-DIMENSIONAL PHYSICAL SIMULATION DEVICE FOR EQUIVALENT COAL SEAM MINING

(71) Applicant: XI'AN UNIVERSITY OF SCIENCE AND TECHNOLOGY, Xi'an (CN)

(72) Inventors: Junwu Du, Xi'an (CN); Qingxiang Huang, Xi'an (CN); Yongle Li, Xi'an (CN)

(73) Assignee: XI'AN UNIVERSITY OF SCIENCE AND TECHNOLOGY, Xi'an (CN)

( * ) Notice: Subject to any disclaimer, the term of this patent is extended or adjusted under 35 U.S.C. 154(b) by 592 days.

(21) Appl. No.: 18/098,159

(22) Filed: Jan. 18, 2023

(65) Prior Publication Data

US 2023/0154357 A1     May 18, 2023

Related U.S. Application Data

(63) Continuation of application No. PCT/CN2022/074587, filed on Jan. 28, 2022.

(30) Foreign Application Priority Data

Feb. 9, 2021     (CN) .......................... 202110181227.0

(51) Int. Cl.
G09B 25/02          (2006.01)
(52) U.S. Cl.
CPC .................................... G09B 25/02 (2013.01)
(58) Field of Classification Search
CPC .............................. G09B 25/02; G01N 33/222

USPC ........................................................ 434/390
See application file for complete search history.

(56) References Cited

FOREIGN PATENT DOCUMENTS

| CN | 101377479 | A | | 3/2009 | |
|----|-----------|---|---|--------|---|
| CN | 102691519 | A | | 9/2012 | |
| CN | 204694490 | U | | 10/2015 | |
| CN | 205538954 | U | | 8/2016 | |
| CN | 107091917 | A | * | 8/2017 | ............. G01N 33/24 |
| CN | 107907180 | A | * | 4/2018 | ............. G01F 17/00 |
| CN | 207993323 | U | | 10/2018 | |
| CN | 109917108 | A | | 6/2019 | |
| CN | 209183102 | U | * | 7/2019 | |
| CN | 211043385 | U | | 7/2020 | |
| CN | 112964852 | A | | 6/2021 | |

(Continued)

*Primary Examiner* — Robert P Bullington
*Assistant Examiner* — Stephen Alvesteffer
(74) *Attorney, Agent, or Firm* — Cooper Legal Group, LLC

(57)          ABSTRACT

Disclosed is an angle-adjustable three-dimensional physical simulation device for equivalent coal seam mining, which comprises a base, a frame, a loading frame, an angle-adjusting device, a limiting plate and a lifting combined module. The top of the base is fixedly connected with the frame; the top of the frame is fixedly connected with the loading frame; the angle-adjusting device is located between the base and the frame; the bottom of the frame is fixedly connected with the limiting plate; the limiting plate is penetrated with a lifting combined module; the lifting combined module comprises a plurality of lifting pieces, and the lifting pieces comprise bolts and cushion blocks; the bolt penetrates through the limiting plate and is in threaded connection with the limiting plate; and one end in the bolt frame is rotatably connected with the cushion block.

7 Claims, 5 Drawing Sheets

(56)                References Cited

FOREIGN PATENT DOCUMENTS

| KR | 101718632 | B1 | 3/2017 |
| WO | 2015112023 | A1 | 7/2015 |

* cited by examiner

FIG. 4

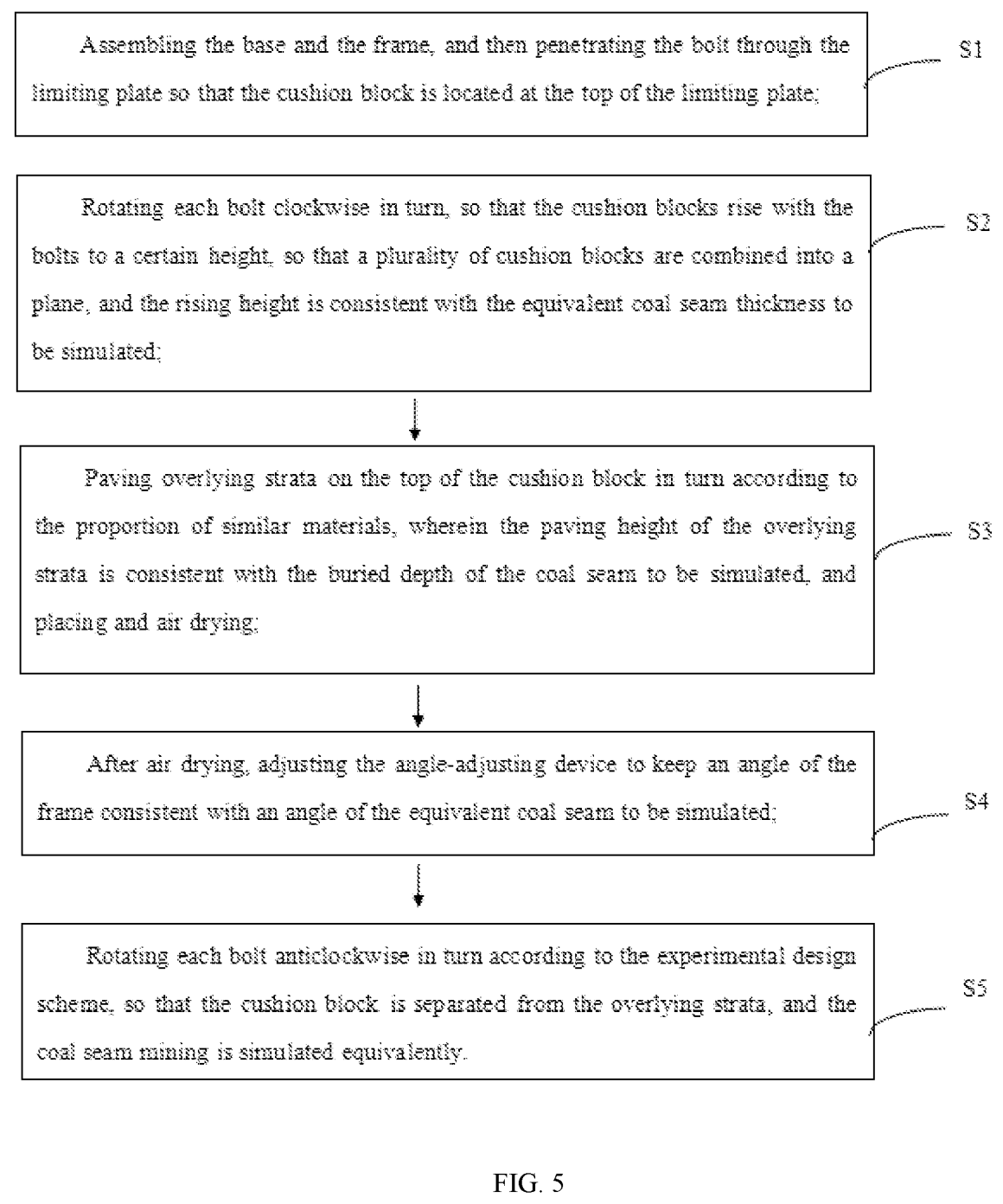

Assembling the base and the frame, and then penetrating the bolt through the limiting plate so that the cushion block is located at the top of the limiting plate; — S1

Rotating each bolt clockwise in turn, so that the cushion blocks rise with the bolts to a certain height, so that a plurality of cushion blocks are combined into a plane, and the rising height is consistent with the equivalent coal seam thickness to be simulated; — S2

Paving overlying strata on the top of the cushion block in turn according to the proportion of similar materials, wherein the paving height of the overlying strata is consistent with the buried depth of the coal seam to be simulated, and placing and air drying; — S3

After air drying, adjusting the angle-adjusting device to keep an angle of the frame consistent with an angle of the equivalent coal seam to be simulated; — S4

Rotating each bolt anticlockwise in turn according to the experimental design scheme, so that the cushion block is separated from the overlying strata, and the coal seam mining is simulated equivalently. — S5

FIG. 5

ANGLE-ADJUSTABLE THREE-DIMENSIONAL PHYSICAL SIMULATION DEVICE FOR EQUIVALENT COAL SEAM MINING

CROSS-REFERENCE TO RELATED APPLICATIONS

This application claims priority to Chinese Patent Application No. 202110181227.0, filed on Feb. 9, 2021, the contents of which are hereby incorporated by reference.

TECHNICAL FIELD

The application relates to the technical field of physical simulation systems, and in particular to an angle-adjustable three-dimensional physical simulation device and a method for equivalent coal seam mining.

BACKGROUND

The essence of physical simulation experiments of similar materials is that materials with similar mechanical properties to engineering prototype are reduced into physical simulation experiment models according to a certain geometric similarity ratio, and the matching number of similar materials is determined according to the geological data of the study area, the mechanical properties of overlying rocks and the similarity principle, and the similar materials are paved layer by layer after the quality of each layer is determined according to the matching number. Similar materials are generally river sand, gypsum and lime powder, and layered materials are mica powder. At present, there are three technical problems in the three-dimensional physical simulation experimental device: firstly, the three-dimensional model tends to be larger than the plane model, and it is difficult to excavate coal seam; secondly, paving inclined coal seams will have the problems of high labor intensity and poor paving quality; thirdly, once the experimental scheme is determined, the scheme cannot be adjusted after the model is excavated, and the flexibility is poor. The existing three-dimensional physical simulation experimental device simulates coal seam excavation by extracting pre-buried wood strips, steel plates, aluminum strips and the like, which greatly disturbs the top and bottom plates during the extraction process, seriously damages the top and bottom plates, and affects the experimental reliability; moreover, the experimental device cannot be sealed, and the physical simulation of water-retaining mining cannot be realized. Meanwhile, the simulation of coal seam dip angle mainly depends on artificial paving of coal seams with different dip angles, which is difficult and ineffective. Therefore, it is important for the three-dimensional physical simulation experimental device to solve the technical problems of coal seam mining, paving of coal seams with different dip angles, water-retaining mining and so on.

SUMMARY

The objective of the present application is to provide an angle-adjustable three-dimensional physical simulation device and a method for equivalent coal seam mining, so as to solve the problems existing in the prior art, effectively simulate a certain three-dimensional space area of an engineering prototype, and realize an accurate, flexible, convenient and low labor-intensive three-dimensional physical simulation experiment.

To achieve the above objectives, the present application provides the following solutions.

The application provides an angle-adjustable three-dimensional physical simulation device for equivalent coal seam mining, which includes a base, a frame, a loading frame, an angle-adjusting device, a limiting plate and a lifting combined module; the top of the base is fixedly connected with the frame; the top of the frame is fixedly connected with the loading frame; the angle-adjusting device is located between the base and the frame; the bottom of the frame is fixedly connected with the limiting plate; the limiting plate is penetrated with the lifting combined module;

the lifting combined module comprises a plurality of lifting pieces; the lifting piece comprises a bolt and a cushion block; the bolt penetrates through the limiting plate and is in threaded connection with the limiting plate; one end of the bolt located in the frame is rotatably connected with the cushion block.

Furthermore, the bolt is screwed with a thickening nut; the thickening nut is fixedly connected with the lower end face of the limiting plate.

Furthermore, the angle-adjusting device comprises a hydraulic cylinder; the bottom end of the hydraulic cylinder is rotatably connected with the base; the output end of the hydraulic cylinder is fixedly connected with the limiting plate; one end of the frame far away from the hydraulic cylinder is rotatably connected with the base.

Furthermore, short rods are rotatably connected to both sides of the base; the short rod is fixedly connected with a threaded barrel; a screw rod penetrates through the screw barrel; the top end of the screw is rotatably connected with a fixed block; a cross bar is fixed between the two fixed blocks; the bottom of the frame is provided with a limiting groove; the cross bar is matched with the limiting groove.

Furthermore, the frame comprises four upright posts; the limiting plate is fixedly connected with the upright post; two adjacent upright posts are rotatably connected with the base; the other two upright posts are detachably connected with the base; a reinforced plexiglass or an height-adjusting channel steel is detachably connected between two adjacent upright posts.

Furthermore, a plurality of through holes are formed on the upright post, the reinforced plexiglass and the height-adjusting channel steel; the upright post is detachably connected with the reinforced plexiglass and the height-adjusting channel steel through bolts; the bolt penetrates through the through hole.

Furthermore, the loading frame is connected with the frame in a sliding way.

An angle-adjustable three-dimensional physical simulation method for equivalent coal seam mining, and the specific steps are as follows.

S1, assembling the base and the frame, and then penetrating the bolt through the limiting plate so that the cushion block is located at the top of the limiting plate;

S2, rotating each bolt clockwise in turn, so that the cushion blocks rise with the bolts to a certain height, so that a plurality of cushion blocks are combined into a plane, and the rising height is consistent with the equivalent coal seam thickness to be simulated;

S3, paving overlying strata on the top of the cushion block in turn according to the proportion of similar materials, wherein the paving height of the overlying strata is consistent with the buried depth of the coal seam to be simulated, and placing and air drying;

S4, after air drying, adjusting the angle-adjusting device to keep an angle of the frame consistent with an angle of the equivalent coal seam to be simulated;

S5, rotating each bolt anticlockwise in turn according to the experimental design scheme, so that the cushion block is separated from the overlying strata, and the coal seam mining is simulated equivalently.

The application discloses the following technical effects:

In the prior art, pre-buried wood strips, steel plates, aluminum strips and the like are extracted to simulate coal seam excavation, and the extraction process has great disturbance to the top and bottom plates, and the top and bottom plates are seriously damaged, which negatively affects the experimental reliability. When simulating the actual coal seam of the project, the application uses the independent liftable cushion block to simulate coal seam mining, and each cushion block is independent of each other as a coal mining unit, and can vertically lift without mutual influence; the overlying strata is paved above the cushion block, which simulates the actual geological conditions of the project, has no disturbance to the roof and floor, and has high experimental simulation reliability. Each cushion block is independent of each other, so the cushion block can lift vertically independently, and can flexibly adjust the mining mode, roadway layout and coal pillar setting of the coal mining face according to the experimental scheme. Compared with the whole extraction in the prior art, the cushion block is more in line with the actual mining situation of the coal mining face. Meanwhile, the application can apply non-hydrophilic sealants such as vaseline between the cushion blocks and around the frame according to the experimental requirements, so that each cushion block forms a sealed platform, and the platform and the frame form a sealed waterproof space, which overcomes the technical problem that the prior art cannot simulate water-retaining mining, and realizes the three-dimensional physical simulation of equivalent coal seam mining under multiple working conditions.

According to the application, the angle-adjusting device is arranged, and the frame is lifted and inclined by operating the angle-adjusting device, so that physical simulation experiments of coal seams with different inclination angles are realized.

The application may not only solve that technical problem of coal seam excavation and inclined coal seam simulation of the exist three-dimensional physical simulation device, simulate different working face layouts and mining mode, but also carry out physical simulation of water-retaining mining. Moreover, the application may effectively simulate a certain three-dimensional space area of different engineering prototypes, and realize an accurate, flexible, convenient and low labor-intensive three-dimensional physical simulation experiment.

BRIEF DESCRIPTION OF THE DRAWINGS

In order to more clearly explain the embodiments of the present application or the technical solutions in the prior art, the following will briefly introduce the drawings that need to be used in the embodiments. Obviously, the drawings in the following description are only some embodiments of the present application. For those of ordinary skill in the art, other drawings may be obtained according to these drawings without any creative labor.

FIG. 4 is the arrangement diagram of lifting parts.

FIG. 5 is a flowchart of the method of the present application.

DETAILED DESCRIPTION OF THE EMBODIMENTS

The technical solutions in the embodiments of the present application will be clearly and completely described below with reference to the drawings in the embodiments of the present application. Obviously, the described embodiments are only part of the embodiments of the present application, but not all of them. Based on the embodiment of the present application, all other embodiments obtained by ordinary technicians in the field without creative labor are within the scope of the present application.

In order to make the above objectives, features and advantages of the present application more obvious and understandable, the present application will be explained in further detail below with reference to the drawings and detailed description.

Embodiment 1

Figure 1:
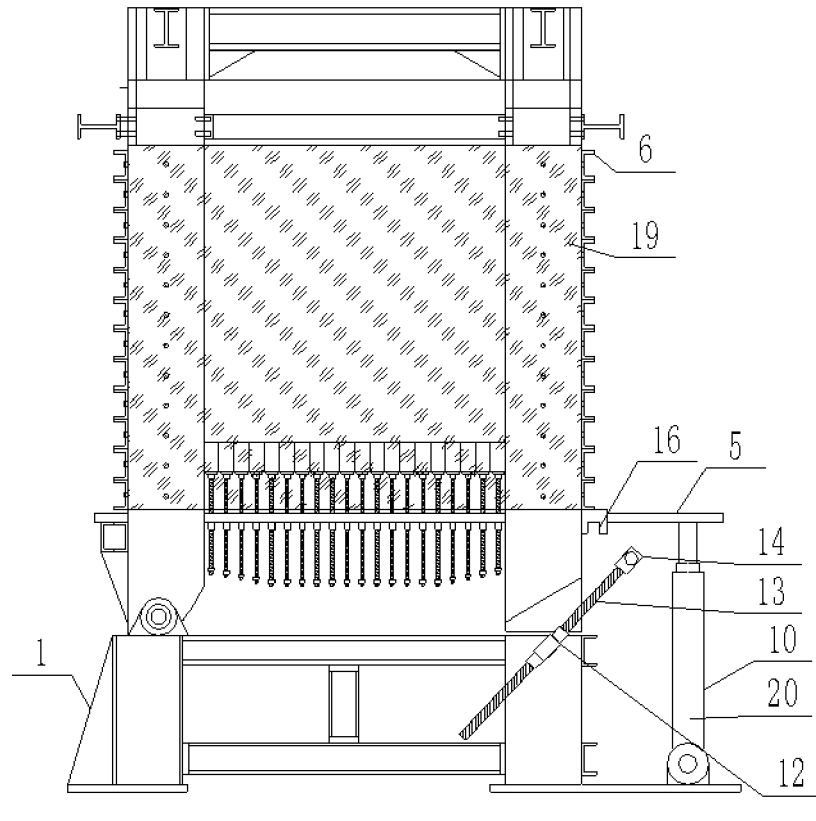
FIG. 1 is a structural schematic diagram of an angle-adjustable three-dimensional physical simulation device for equivalent coal seam mining.
Figure 2:
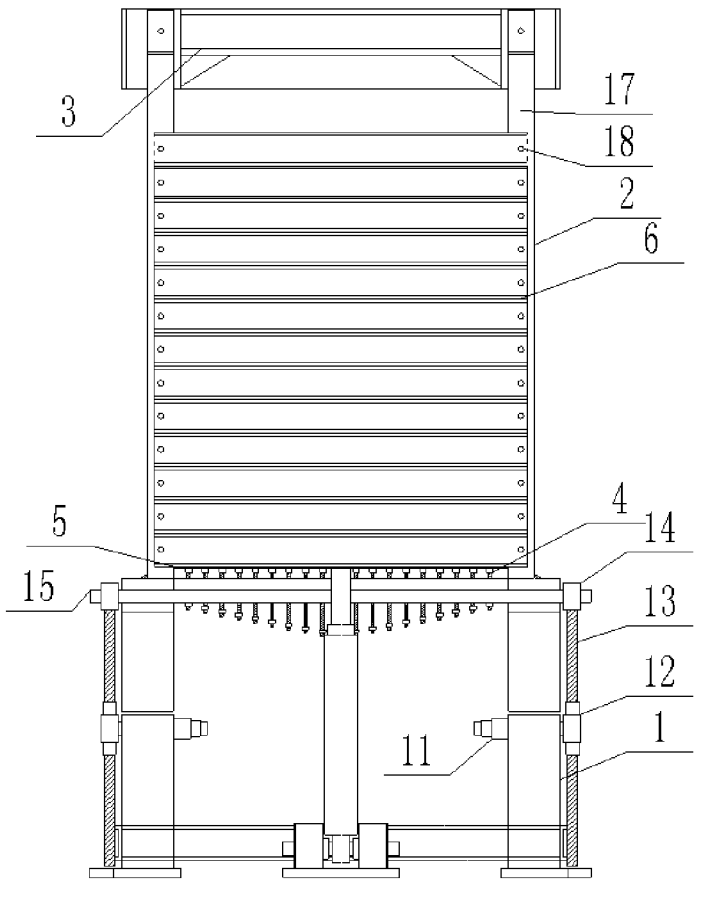
FIG. 2 is the left view of the angle-adjustable three-dimensional physical simulation device for equivalent coal seam mining.
Figure 3:
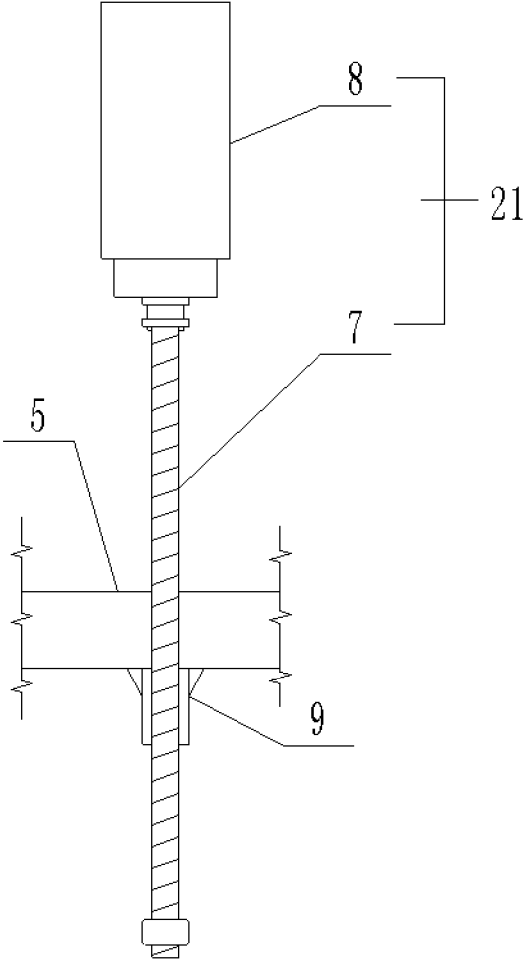
FIG. 3 is a schematic structural diagram of the lifting piece.

With reference to FIGS. 1-3 and 5, the application provides an angle-adjustable three-dimensional physical simulation device for equivalent coal seam mining, which includes a base 1, a frame 2, a loading frame 3, an angle-adjusting device 20, a limiting plate 5 and a lifting combined module 4; the top of the base 1 is fixedly connected with the frame 2; the top of that frame 2 is fixedly connected with the loading frame 3; the angle-adjusting device 20 is located between the base 1 and the frame 2; the bottom of the frame 2 is fixedly connected with the limiting plate 5; the limiting plate 5 is penetrated with a lifting combined module 4;

The lifting combined module 4 includes a plurality of lifting pieces 21; the lifting piece 21 includes a bolt 7 and a cushion block 8; the bolt 7 penetrate through the limiting plate 5 and is screwed with the limiting plate 5; one end of the bolt 7 located in the frame 2 is rotatably connected with the cushion block 8; the cushion block 8 is preferably an aluminum block.

When in use, the specific steps are as follows.

S1, firstly assembling the base 1 and the frame 2, and then penetrating the bolt 7 through the limiting plate 5 so that the cushion block 8 is located at the top of the limiting plate 5;

S2, rotating each bolt 7 clockwise in turn, so that the cushion blocks 8 rise with the bolts 7 to a certain height, so that a plurality of cushion blocks 8 are combined into a plane, and the rising height is consistent with the equivalent coal seam thickness to be simulated;

S3, paving overlying strata on the top of the cushion block 8 in turn according to the proportion of similar materials, wherein the paving height of the overlying strata is consistent with the buried depth of the coal seam to be simulated, and placing and air drying;

S4, after air drying, adjusting the angle-adjusting device to keep an angle of the frame 2 consistent with an angle of the equivalent coal seam to be simulated;

S5, rotating each bolt 7 anticlockwise in turn according to the experimental design scheme, so that the cushion block 8 is separated from the overlying strata, and the coal seam mining is simulated equivalently.

In another embodiment, the bolt 7 is screwed with a thickening nut 9; the thickening nut 9 is fixedly connected with the lower end face of the limiting plate 5; the limiting plate 5 and the thickening nut 9 are both screwed with the bolt 7, and to increase the contact area of the bolt 7 with the limiting plate 5 and the thicken nut 9, and enhance the stability between the bolt 7 and the limiting plate 5.

In another embodiment, the angle-adjusting device 20 includes a hydraulic cylinder 10; the bottom end of the hydraulic cylinder 10 is rotatably connected with the base 1; the output end of the hydraulic cylinder 10 is fixedly connected with the limiting plate 5; one end of the frame 2 away from the hydraulic cylinder 10 is rotatably connected with the base 1; during the coal seam inclination experiment, the hydraulic cylinder 10 lifts the frame 2, and the simulated dip angle is in the range of 0-50.

In another embodiment, the two sides of the base 1 are rotatably connected with short rods 11 respectively; the short rod 11 is fixedly connected with a threaded barrel 12; the threaded barrel 12 is penetrated with a screw 13; the top end of that screw 13 is rotatably connected with a fixed block 14; a cross bar 15 is fixed between the two fixed blocks 14; the bottom of the frame 2 is provided with a limiting groove 16; the cross bar 15 is matched with the limiting groove 16; when the frame 2 is raised to the predetermined experimental position, the screw 13 is supported, so that the cross bar 15 is embedded in the limiting groove 16, and the safety of the experiment is improved.

In another embodiment, the frame 2 includes four upright posts 17; the limiting plate 5 is fixedly connected with the upright post 17; two adjacent upright posts 17 are rotatably connected with the base 1; the other two upright posts 17 are detachably connected with the base 1; a reinforced plexiglass 19 or an height-adjusting channel steel 6 is detachably connected between two adjacent upright posts 17; 1-3 sides of reinforced plexiglass 19 can be installed on the frame 2, and 1-3 sides of height-adjusting channel steel 6 can also be installed. The installation method may be flexibly adjusted according to the experimental observation needs.

In another embodiment, the upright post 17, the reinforced plexiglass 19 and the height-adjusting channel steel 6 are all provided with a plurality of through holes 18; the upright post 17 is detachably connected with the reinforced plexiglass 19 and the height-adjusting channel steel 6 by bolts; the bolt penetrate through that through hole 18. The plexiglass 19 may realize the visual observation function during the experiment, and the height-adjusting channel steel 6 facilitates the paving of the three-dimensional physical model.

In another embodiment, the top of the frame 2 is provided with a loading frame 3, which is connected with the frame 2 in a sliding way, and the loading frame 3 may be adjusted up, down, left and right to realize loading experiments in different positions.

Embodiment 2

Figure 4:
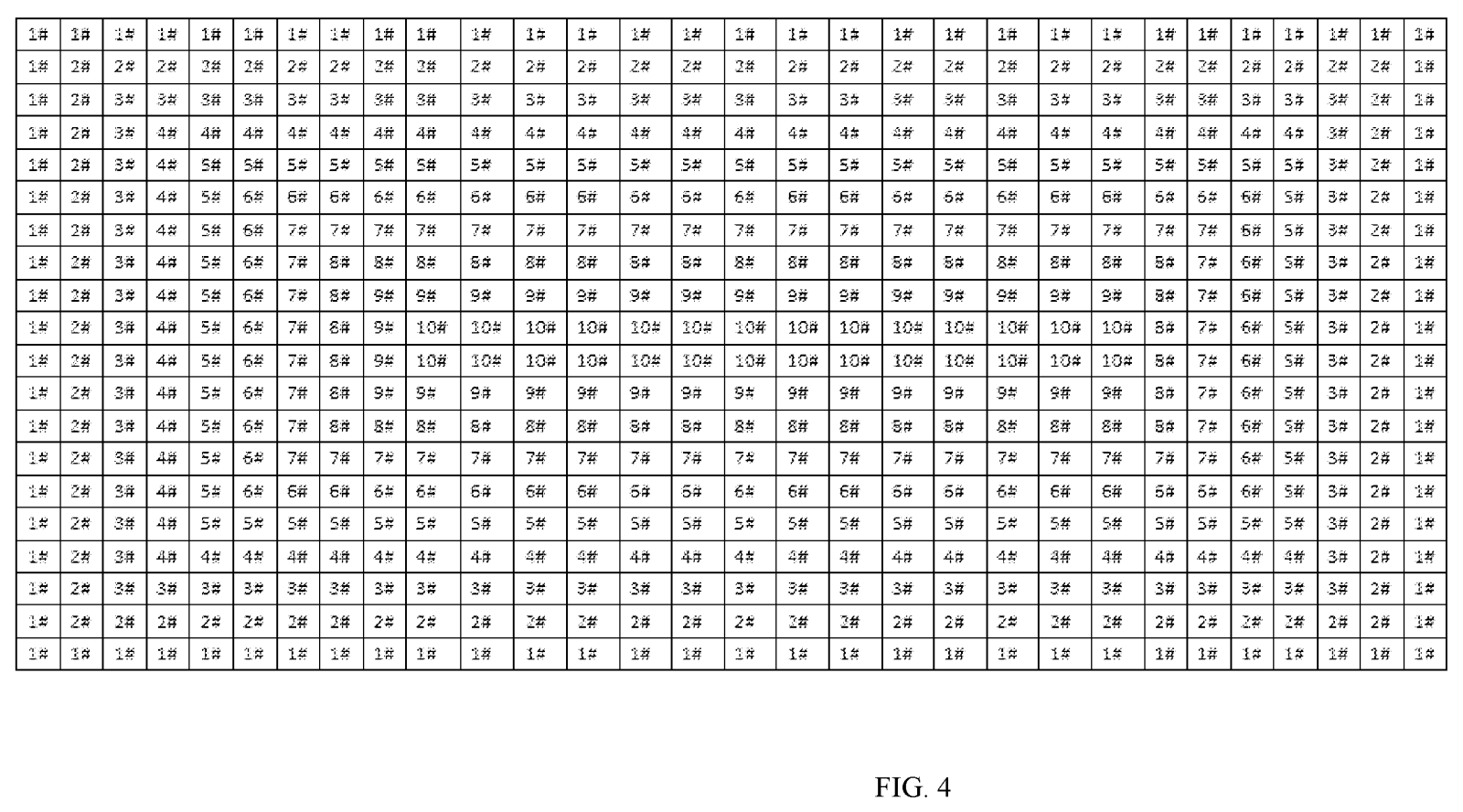

With reference to FIG. 4, in order to make the objective and advantages of the application clearer, taking the mining of a fully mechanized coal mining face in a mine as an example, the designed mining height of the working face is 6.8 m, the width of is 160 m, the average buried depth of the coal seam is 110 m, and the dip angle is about 1°, which is a nearly flat coal seam. The proportion of similar materials is determined according to the geological data of the study area, mechanical properties of overlying strata and similarity principle, and the geometric similarity ratio is 1:200. Therefore, the three-dimensional physical simulation size is: length×width×height=1500 mm×1000 mm×550 mm. In order to eliminate the boundary effect, boundary coal pillars with a width of 100 mm are left in front of and behind the working face, and boundary coal pillars with a width of 200 mm are left from the mining stop line of the working face to the right side of the model. The equivalent coal seam size is: length×width×height=1300 mm×800 mm×34 mm, and the coal seam thickness is 34 mm. The base 1 and frame 2 are mainly composed of 25#b channel steel, 10# channel steel, 8# channel steel, 20#b I-beam and 16#b I-beam with high strength bolts. The whole structure of the device can be disassembled, which is convenient for later movement and maintenance. The four vertical upright posts 17 are four vertical channel steels, and the through holes 18 with a diameter of φ10.5 mm are designed every 100 mm on the upright posts 17, which can facilitate the installation of high-strength reinforced plexiglass 19 and 10# height-adjusting channel steel 6. A space with a height of 820 mm is left at the bottom of the limiting plate 5, which is convenient for the experimenter to operate the bolt 7. 1 The bottom of the base is connected to the ground with expansion screws to increase the overall stability of the device. The 16#b thickened I-beam is used at top to form the loading frame 3, and the loading frame 3 is adjusted up, down, left and right, so as to realize loading experiments in different positions.

The lifting range of the cushion block 8 is 0-100 mm, the size of each cushion block 8 is: length×width×height=50 mm×50 mm×100 mm, and the size of the bolt 7 is M10× 270-360 mm. 600 bolts 7 and cushion blocks 8 form the lifting combined module 4. In order to facilitate the experimental operation, the length of the bolts 7 in the lifting combined module 4 increases from outside to inside, and the bolt length increases by 10 mm every time it turns inward a circle. The outermost circle of the lifting piece 21 on the limiting plate 5 is the 1# lifting piece 21, with the bolt length of 270 mm; and the innermost circle is the 10# lifting piece 21, with the bolt length of 360 mm; there are 96 1# lifting pieces 21 in total, and the length of bolt 7 is 270 mm. There are 88 2# lifting pieces 21 in total, and the length of bolt 7 is 280 mm; there are 80 3# lifting pieces 21 in total, and the length of bolt 7 is 290 mm; there are 72 4# lifting pieces 21 in total, and the length of bolt 7 is 300 mm; there are 64 5# lifting pieces 21 in total, and the length of bolt 7 is 310 mm; there are 56 6# lifting pieces 21 in total, and the length of bolt 7 is 320 mm; there are 48 7# lifting pieces 21 in total, and the length of bolt 7 is 330 mm; there are 40 8# lifting pieces 21 in total, and the length of bolt 7 is 340 mm; there are 32 9# lifting pieces 21 in total, and the length of bolt 7 is 350 mm; there are 24 10# lifting pieces 21 in total, and the length of bolt 7 is 360 mm.

The size of the limiting plate 5 is: length×width×thickness=1800×1000×30 mm. Bolt holes with diameters of 10 mm are drilled in the limiting plate 5, and the spacing between the bolt holes is 50 mm×50 mm. There are 600 bolt holes in total, and 8.8 M10 thickening nuts 9 with a thickness of 30 mm are welded at the bottom of each bolt hole. 1#-10# lifting pieces 21 (600 pieces in total) are fixed on the limiting plate 5 through bolt holes and thickening nuts 9. By screwing bolts 7, each lifting piece 21 may be lifted independently without affecting other lifting pieces 21. Screw the bolt 7 for one circle, and the high-strength cushion block will rise or fall by 1.5 mm.

The application of the device may realize the three-dimensional simulation of the working face, which is similar to the mining conditions of the working face. The implementation steps are as follows:

(1) leveling 600 lifting pieces 21 with M10 wrench to keep 600 pads 8 on the same plane;

(2) the front and rear rows of the device are equipped with 1# lifting pieces 21 and 2# lifting pieces 21 (each with a width of 100 mm), and the right side of the device is equipped with 1# lifting pieces 21 to 4# lifting pieces 21 (each with a width of 200 mm). The heights of 184 lifting pieces 21 remain unchanged;

(3) the other 416 lifting pieces 21 are screwed in 22.7 circles in turn, and each cushion block 8 is raised by 34 mm. The combined length of the 416 lifting pieces 21 is 1300 mm and the width is 800 mm, and the raised 34 mm is the mining height of simulated working face coal seam, which is consistent with the equivalent coal seam thickness to be simulated;

(4) calculating the simulated coal seam material according to the similar material proportion number, and paving the material on the cushion block 8 of the 1# lifting pieces 21 and 2# lifting pieces 21 at the device front and rear rows, and 1# lifting pieces 21-4# lifting pieces 21 at the right side of the device; the paving height is 34 mm, which is consistent with the equivalent coal seam thickness; simulating the boundary coal pillar with the width of 100 mm in front and back of the working face and the boundary coal pillar with the width of 200 mm from the stop mining line to the right side of the model;

(5) paving the overlying strata to the surface in turn according to the proportion number of similar materials, with the paving height of 516 mm; the final three-dimensional physical simulation size is: length×width×height=1500 mm×1000 mm×550 mm; after the model paving is finished, air-drying.

(6) after air drying, starting the hydraulic cylinder 10, adjusting the inclination angle of the frame 2 to 1°, support two screws 13, and embedding the cross bar 15 into the limiting groove 16 to improve the safety of the experiment;

(7) after the angle adjustment, starting the experiment; according to the experimental design scheme, screwing back each lifting piece 21 in turn, 22.7 circles, and reduce each combined module by 34 mm; the reduction distance is consistent with the equivalent coal seam thickness, which is equivalent to simulating coal seam mining.

It is easy to unscrew each lifting piece 21, which effectively solves the technical problem of three-dimensional physical simulation of coal seam excavation; meanwhile, the lifting piece 21 has little disturbance to the top plate, which improves the accuracy and reliability of the experiment. Finally, the lifting pieces 21 are independent of each other, so that the experimental scheme can be flexibly adjusted according to the actual needs in the experimental process, and the experimental requirements of different working face layout and mining methods can be simulated, thus solving the technical problem of poor flexibility of traditional physical simulation. Moreover, according to the experimental requirements, non-hydrophilic sealants such as vaseline can be coated between the cushion blocks 8 and around the frame 2, so that each cushion block 8 forms a sealed platform, and the platform and the frame 2 form a sealed waterproof space, which overcomes the technical problem that the prior art cannot simulate water-retaining mining, and realizes three-dimensional physical simulation of equivalent coal seam mining under multiple working conditions.

In the description of the present application, it is to be understood that the orientations or positional relationships indicated by the terms such as "longitudinal", "transverse", "up", "down", "front", "back", "left", "right", "vertical", "horizontal", "top", "bottom", "inside", "outside", etc., are the orientations or positional relationships based on the accompanying drawings and are intended only to facilitate the description of the application and do not indicate or imply that the device or element referred to must have a particular orientation, be constructed and operate in a particular orientation, and are therefore not to be construed as a limitation.

The embodiments described above are only a description of the preferred way of the application and are not intended to limit the scope of the application. Without departing from the spirit of the design of the application, all variations and improvements made to the technical solutions of the application by persons of ordinary skill in the art shall fall within the scope of protection determined by the claims of the application.

What is claimed is:

1. An angle-adjustable three-dimensional physical simulation device for equivalent coal seam mining, comprising a base, a frame, a loading frame, an angle-adjusting device, a limiting plate and a lifting combined module; wherein a top of the base is fixedly connected with the frame; a top of the frame is fixedly connected with the loading frame; the angle-adjusting device is located between the base and the frame; a bottom of the frame is fixedly connected with the limiting plate; and the limiting plate is penetrated with the lifting combined module;

wherein the lifting combined module comprises a plurality of lifting pieces; each one of the lifting pieces comprises a bolt and a cushion block; the bolt penetrates through the limiting plate and is in threaded connection with the limiting plate; and one end of the bolt located in the frame is rotatably connected with the cushion block; and wherein the loading frame is connected with the frame in a sliding way.

2. The angle-adjustable three-dimensional physical simulation device for equivalent coal seam mining according to claim 1, wherein the bolt is screwed with a thickening nut; and the thickening nut is fixedly connected with a lower end face of the limiting plate.

3. The angle-adjustable three-dimensional physical simulation device for equivalent coal seam mining according to claim 1, wherein the angle-adjusting device comprises a hydraulic cylinder; a bottom end of the hydraulic cylinder is rotatably connected with the base; an output end of the hydraulic cylinder is fixedly connected with the limiting plate; one end of the frame further away from the hydraulic cylinder is rotatably connected with the base.

4. The angle-adjustable three-dimensional physical simulation device for equivalent coal seam mining according to claim 3, wherein short rods are rotatably connected to both sides of the base respectively; the short rods are fixedly connected with threaded barrels; screw rods penetrate through the threaded barrels; top ends of the screw rods are rotatably connected with two fixed blocks; a cross bar is fixed between the two fixed blocks; the bottom of the frame is provided with a limiting groove; and the cross bar is matched with the limiting groove.

5. The angle-adjustable three-dimensional physical simulation device for equivalent coal seam mining according to claim 1, wherein the frame comprises four upright posts; the limiting plate is fixedly connected with the upright posts;

two adjacent upright posts are rotatably connected with the base; other two upright posts are detachably connected with the base; and a reinforced plexiglass or a height-adjusting channel steel is detachably connected between the two adjacent upright posts.

6. The angle-adjustable three-dimensional physical simulation device for equivalent coal seam mining according to claim 5, wherein a plurality of through holes are formed on the upright posts, the reinforced plexiglass and the height-adjusting channel steel; the upright posts are detachably connected with the reinforced plexiglass and the height-adjusting channel steel through bolts; and the bolts penetrate through the through holes.

7. An angle-adjustable three-dimensional physical simulation method for equivalent coal seam mining to be applied in the angle-adjustable three-dimensional physical simulation device for equivalent coal seam mining according to claim 1, wherein the specific steps are as follows:

S1, assembling the base and the frame, and then penetrating bolts through the limiting plate so that cushion blocks are located at a top of the limiting plate;

S2, rotating each bolt clockwise in turn, so that the cushion blocks rise with the bolts to a certain height, a plurality of the cushion blocks are combined into a plane, and the rising height is consistent with an equivalent coal seam thickness to be simulated;

S3, paving overlying strata on tops of the cushion blocks in turn according to a proportion of similar materials, wherein a paving height of the overlying strata is consistent with a buried depth of the coal seam to be simulated, placing and air drying;

S4, after air drying, adjusting the angle-adjusting device to keep an angle of the frame consistent with an angle of the equivalent coal seam to be simulated; and S5, rotating each bolt anticlockwise in turn according to an experimental design scheme, so that the cushion blocks are separated from the overlying strata, and the coal seam mining is simulated equivalently.

\* \* \* \* \*